(12) United States Patent
Uno et al.

(10) Patent No.: US 6,714,378 B1
(45) Date of Patent: Mar. 30, 2004

(54) POSITIONING METHOD, POSITIONING DEVICE AND DISK DEVICE

(75) Inventors: Hiroshi Uno, Kawasaki (JP); Nobuyoshi Yamasaki, Kawasaki (JP); Kiichiro Kasai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 257 days.

(21) Appl. No.: 09/620,479

(22) Filed: Jul. 20, 2000

(30) Foreign Application Priority Data

Sep. 17, 1999 (JP) .......................................... 11-264228
Mar. 24, 2000 (JP) ....................................... 2000-085149

(51) Int. Cl.[7] .............................................. G11B 5/596
(52) U.S. Cl. ...................................... 360/78.04; 360/75
(58) Field of Search ........................... 360/78.04, 77.03, 360/75

(56) References Cited

U.S. PATENT DOCUMENTS 5,319,509 A * 6/1994 Michelson et al. ......... 360/137
5,384,675 A * 1/1995 Crawforth et al. ............ 360/75
5,654,841 A * 8/1997 Hobson et al. .............. 324/210
6,002,549 A * 12/1999 Berman et al. ........... 360/294.4
6,072,652 A * 6/2000 Lee ............................ 360/71

FOREIGN PATENT DOCUMENTS

JP 7176154 7/1995

* cited by examiner

*Primary Examiner*—David Hudspeth
*Assistant Examiner*—K Wong
(74) *Attorney, Agent, or Firm*—Greer, Burns & Crain, Ltd.

(57) ABSTRACT

A positioning method and a positioning device are disclosed for controlling an actuator and moving it to a target position. The positioning method generates a random wave signal RN and detects a position error from the target position. The servo control signal CV is generated to position the actuator back to the target position, and the random wave signal RN is added to the servo control signal CV to generate a control signal. Since a random, minute vibration is constantly applied to the actuator to avoid the assumption of a static state by bearings of the actuator, the actuator is affected only by dynamic friction, and relative to the control value, its movement is representative of a linear characteristic. As a result, the positioning accuracy is enhanced, and since the random wave is employed, there is no deterioration of the positioning accuracy of the servo system.

20 Claims, 7 Drawing Sheets

Prior art

FIG. 9

POSITIONING METHOD, POSITIONING DEVICE AND DISK DEVICE

BACKGROUND OF THE INVENTION

1. Field of the Invention

The present invention relates to a positioning method and a positioning device for controlling the position of an actuator, and relates in particular to a positioning method and a positioning device for precisely positioning, above a track, an actuator for which bearings are employed.

2. Related Arts

Positioning devices are widely employed in a variety of apparatuses. For example, servo positioning system, for positioning a read/write head above tracks on a recording disk, are provided for a disk drive, such as magnetic disk drives, which are employed as computer storage devices. Recently, magnetic disk drives recording densities have been dramatically increased. Of the factors that have made such increases possible, one was the introduction and development of the MR (magneto-resistive) heads that are now in common use. By applying the magneto-resistive effect, MR heads have facilitated the precise detection of magnetized states, and since, as a result, higher recording face densities have therefore become feasible, as has the use of narrower recording disk track widths, they have also helped to establish a need for a precise servo system positioning function.

Figure 8:
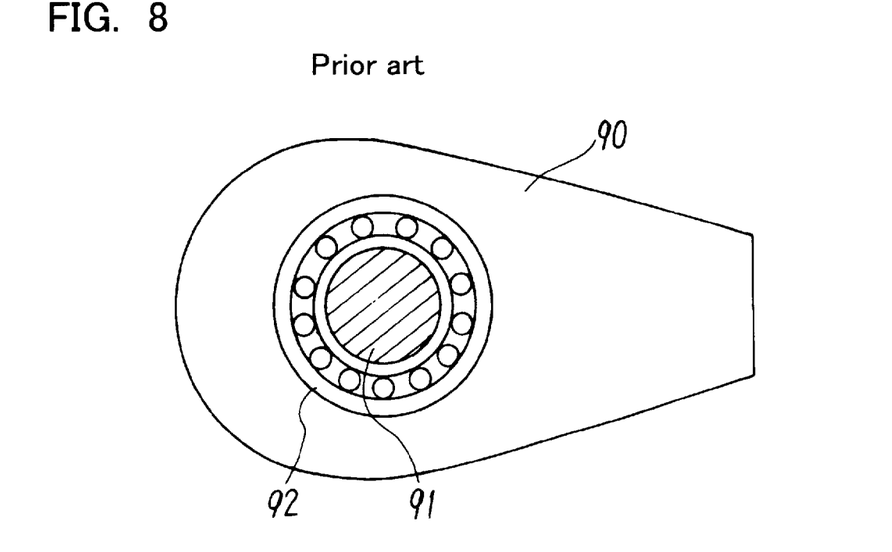
FIG. 8 is a diagram for explaining the prior art.
Figure 9:
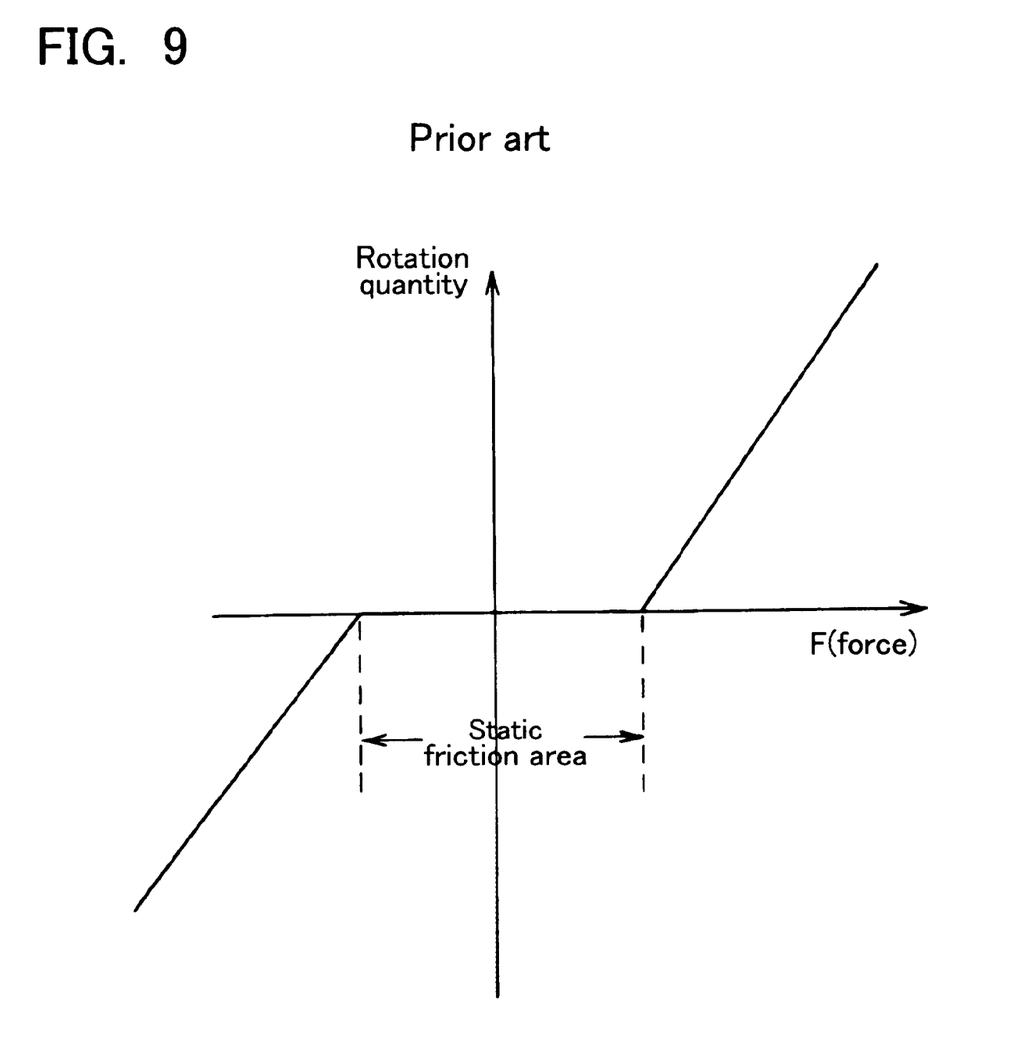
FIG. 9 is a graph showing the characteristic of a conventional actuator.

FIG. 8 is a diagram for explaining the prior art, and FIG. 9 is a graph showing the characteristics of ball bearings which is used to explain the prior art.

A magnetic disk drive includes a magnetic disk, a magnetic head, a spindle motor for rotating the magnetic disk, an actuator for moving the magnetic head, and a servo system, for positioning the magnetic head above a track on the magnetic disk.

The servo system can precisely position or control the head to protect against disturbances, such as the vibration of the spindle motor caused by a manufactured balance error of a ball bearing used to support the shaft of a spindle motor and a wave that the actuator receives from the disk, etc. The actuator for moving the head also includes bearings to ensure that it moves smoothly. As is shown in FIG. 8, for example, in the magnetic disk drive, an actuator 90, which is a voice coil motor (VCM) for moving a magnetic head, is rotatably fitted around a fixed shaft 91 via ball bearings 92.

It is inevitable that some slight friction will exist in the ball bearings. The types of such friction include static friction an dynamic friction. When using friction coefficients to represent friction levels, it is found that a static friction coefficient is considerably larger than a dynamic friction coefficient.

Since the track pitch is reduced for a magnetic disk, precise positioning is required when tracing a track. However, when the servo system outputs to the actuator only a minute control value (force), which is equal to or smaller than the static friction coefficient, the actuator will not move. That is, as is shown in FIG. 9, the relationship between the force F to be exerted on the bearings 92 and the rotating quantities is represented non-linearly inside the static friction region, while the relationship is represented linearly outside the static friction region.

That is, when the traveling distance is very small, bearing movement is representative of the non-linear characteristic. As a result, since bearing movement is representative of the non-linear characteristic, if a minute control value is output for the minuscule traveling distance required to follow a track, the actuator will not move in response to the output of that control value. Thus, deterioration of the track following function occurs.

Further, since the actuator will not react when a minute control value is output, it will not move unless there is a degree of increase in an error value. And as the actuator will not move until a number of errors have been accumulated, when it does move, it moves clumsily, and an overrun tends to occur. As a result, deterioration of the positioning accuracy of the servo system occurs. And since track densities have been so dramatically increased, due to the non-linear characteristic of the bearing movement, an especially outstanding deterioration in the positioning accuracy occurs.

To resolve the above problem, an actuator which does not employ ball bearings has been proposed (e.g., U.S. Pat. No. 5,355,268). In this actuator, a bearing is composed of a member having a knife-edge shape and a magnet. In such a construct, the bearing function is basically provided by point contact, which can reduce static friction.

However, the prior art has the following problems.

(1) Since the bearing function is provided by point contact, repetitive operation of a device is accompanied by wear, and proper functioning can not be provided over an extended period of time. Thus, a short service-life problem has arisen.

(2) Since the actuator is supported by the magnet, they have weak unit-shock characteristics.

SUMMARY OF THE INVENTION

It is, therefore, one objective of the present invention to provide a positioning method and a positioning device for improving the positioning accuracy attained by a servo system, even when bearings are employed which are affected by static friction.

It is another objective of the present invention to provide a positioning method and a positioning device for improving the positioning accuracy of a servo system for which special bearings are not required.

It is an additional objective of the present invention to provide a positioning method and a positioning device for the narrowing of tracks even when an actuator is used in which ball bearings are employed.

To achieve these objectives, according to a first aspect of the present invention, a positioning method for position-controlling an actuator to a target position comprises steps of:

generating a random wave signal;

detecting a positional error to the target position for the actuator;

producing a servo control signal to position the actuator to the target position from said positional error;

adding the random wave signal to the servo control signal to produce a control signal; and driving the actuator in accordance with the control signal.

In the present invention, a random and minute vibration is constantly applied to the actuator to prevent the bearings in the actuator from assuming a static state. As a result, only dynamic friction affects the operation of the actuator, and relative to the control value, the actuator movement is representative of the linear characteristic. In this manner, positioning accuracy is enhanced.

Although the random, minute control value, which is constantly applied to the servo system, corresponds to a disturbance (noise), and as such, contributes to a loss in positioning accuracy, the improvement in the positioning accuracy produced by the linear characteristic of the bearing movement is greater than the loss referred to above. And as a result, overall positioning accuracy is improved.

Further, since the power spectrum of a random wave is flat, even when a random wave is introduced into the servo system, a exciting quantities of a resonance point of the servo system are small.

In addition, since both the position error quantities and the random wave are representative of normal distributions, the normal distributions are added together. And as the acquired sum is smaller than the result obtained by simply adding signals which are not normally distributed, the quantities of the disturbance (control quantities) can be increased.

According to one more aspect of the invention, the generating step includes a step for the generation of a random wave for so driving the actuator that a static friction state of the actuator bearings is canceled out.

As a result, the assumption of a static state by the actuator bearings can be effectively eliminated.

According to another aspect of the invention, the generating step includes a step for the generation of a random number having a predetermined cycle.

According to this aspect, since the random number is generated, a random wave can be easily produced by using a digital calculation procedure.

According to an additional aspect of the present invention, the producing step includes steps of:

Reading a signal from a track on a recording medium by a head provided for the actuator, and detecting the positional error from the read signal; and generating the servo control signal in accordance with the positional error for following the head with the track.

According to this aspect, since the invention is employed to control a head which is following a track, control can be precisely exercised even when bearings are employed, and even when a narrower track pitch is employed.

According to a further aspect of the present invention, the producing step includes steps of:

generating a second servo control signal in accordance with the positional error when seeking a target track for the head; and selecting the step whereat the servo control signal is generated or the step whereat the second servo control signal is generated. The positioning method further comprises a step of:

driving the actuator in accordance with the second servo control signal when the step of generating the second servo control signal is selected.

According to this aspect, since a random wave is not supplied during seek control, whereat a static state of the bearings does not occur, the admission to the servo system of an unwanted disturbance can be prevented.

According to yet one more aspect of the invention, the positioning method further comprises: a step of adjusting the level of a random wave in order to minimize a standard deviation for the position shift distance.

According to this aspect, since the level of the random wave is so adjusted that the position shift distance is minimized, deterioration of the positioning accuracy of the servo system due to a disturbance can be minimized, while the assumption of a bearing static state is avoided.

According to yet another aspect of the invention, the step whereat an adjustment occurs includes steps of:

measuring the standard deviation of the positional error; and determining a level for the random wave which will minimize the standard deviation of the position shift distance.

According to this aspect, since the standard deviation of the position shift distance is measured automatically, the level of the random wave can be automatically adjusted to the optimal value.

According to yet an additional aspect of the present invention, the detecting step a step of:

Sampling the output of the head in accordance with a servo gate signal, and generating a positional error which indicates a distance the head has shifted away from the track, wherein the producing step includes a step whereat the servo control signal is produced in accordance with the servo gate signal, and wherein the generating step includes a step whereat a random wave is generated which has a frequency which is higher than the frequency of the servo gate signal.

Since the frequency of the random wave is higher than is that of the servo control signal, the actuator can be vibrated slightly without adversely affecting the accuracy of the positioning for which the servo control signal is used.

DETAILED DESCRIPTION OF THE PREFERRED EMBODIMENT

Figure 1:
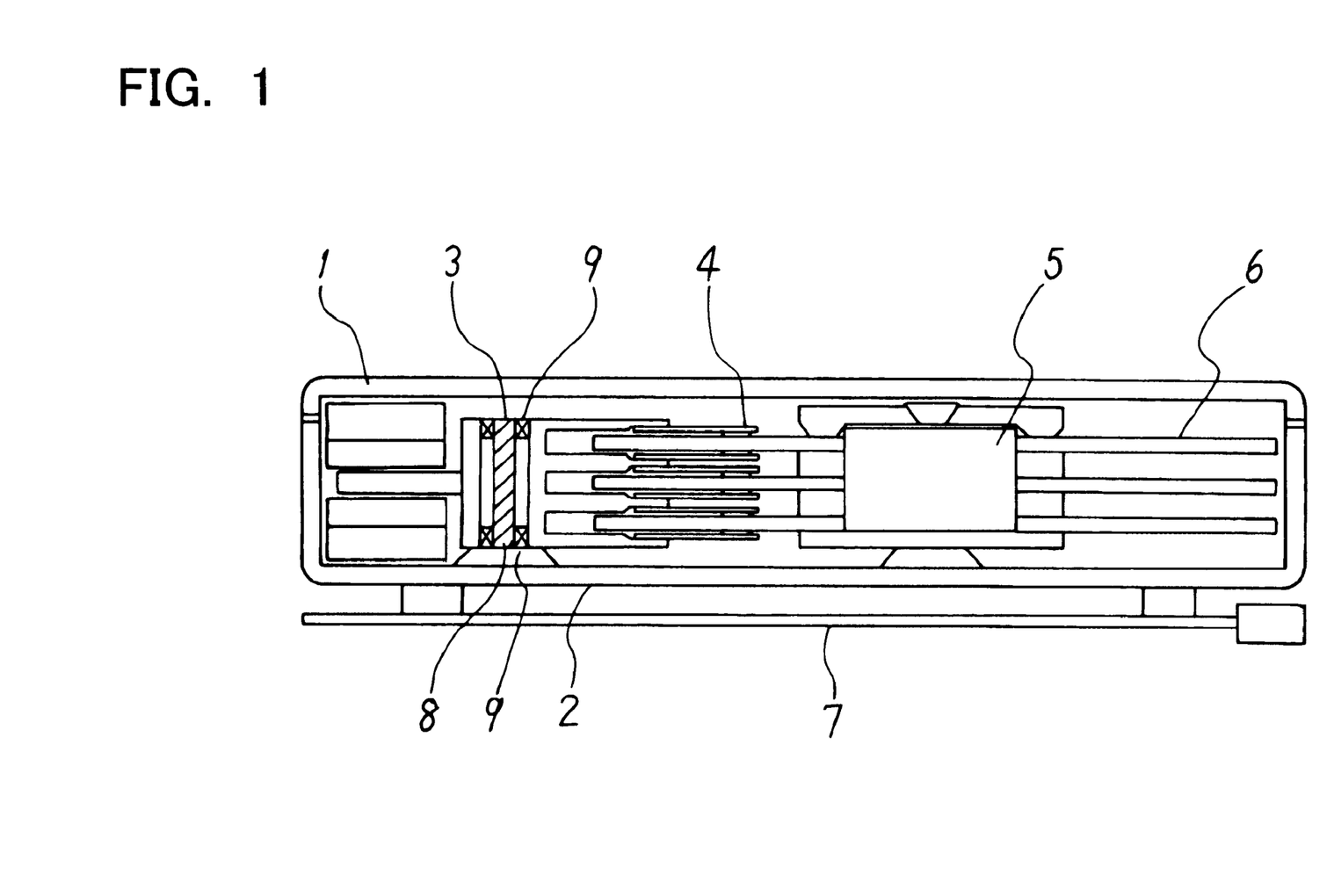
FIG. 1 is a diagram illustrating the arrangement of a magnetic disk drive according to one embodiment of the present invention.
Figure 2:
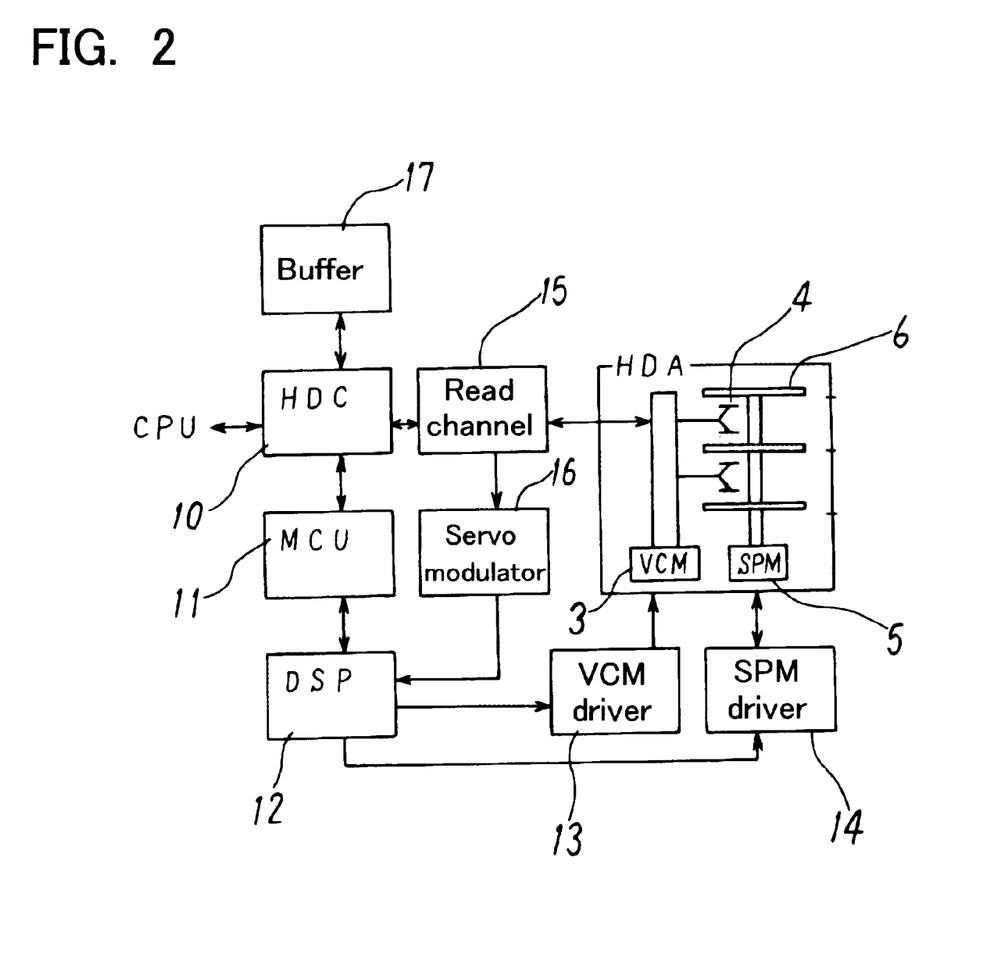
FIG. 2 is a block diagram illustrating the magnetic disk drive in FIG. 1.

FIG. 1 is a diagram illustrating the arrangement of a magnetic disk drive according to one embodiment of the present invention, and FIG. 2 is a block diagram illustrating the magnetic disk drive.

As is shown in FIG. 1, a magnetic disk 6 is formed by laminating a magnetic recording layer on a substrate. A spindle motor 5 supports and rotates the magnetic disk 6. A magnetic head 4, which is provided for an actuator 3, reads data from and writes data to the magnetic disk 6. The actuator 3, which is constituted by a voice coil motor, positions the magnetic head 4 above a desired track on the magnetic disk 6.

Since the actuator 3 is fitted around a fixed shaft 8 via ball bearings 9, the actuator 3 can be smoothly rotated around the shaft 8 by the ball bearings 9.

The actuator 3 and the spindle motor 5 are arranged in a drive-base 2. A cover 1 covers the drive base 2 and separates the inside of the drive from the outside. Located outside the drive is a print board 7 on which the controller of the drive is mounted.

FIG. 2 is a block diagram illustrating the controller which is mounted on the print board 7.

A HDC (Hard Disk Controller) 10 generates control signals for the inside of the magnetic disk drive in order to exercise the interface control it shares with a host CPU, such as the exchange of various commands and data with the host CPU, and to control the format for the recording and reproduction processes performed for the magnetic disk 6.

AMCU (Micro Control Unit) 11 is constituted by a MPU (Micro Processing Unit). The MPU 11 controls the HDC 10, a DSP (Digital Signal Processor) 12 and a buffer 17, in accordance with a program stored in a memory.

The buffer 17 is used to temporarily store write data received from the host CPU and read data received from the magnetic disk 6.

The DSP 12 is constituted by a processor which exercises servo control of the positioning of the magnetic head 4. The DSP 12 executes the program stored in the memory to recognize a position signal output by a servo demodulator 16, and to control a VCM control current for a VCM (Voice Coil Motor) driver 13 and a drive current for an SPM (Spindle Motor) driver 14.

The VCM driver 13 is constituted by a power amplifier which transmits a drive current to a VCM (Voice Coil Motor) 3 to rotate a carriage having a magnetic head. The VCM 3 corresponds to the actuator 3 in FIG. 3, and the SPM driver 14 is constituted by a power amplifier which transmits a drive current to a spindle motor (SPM) 5 which rotates the magnetic disk 6.

A read channel 15, which is a circuit for recording and reproduction, includes: a modulator for recording, on the magnetic disk 6, write data received from the CPU; a parallel/serial converter; a demodulator for reproducing data received from the magnetic disk 6; and a serial/parallel converter.

The servo demodulator 16 is a circuit for demodulating a servo pattern recorded on the magnetic disk 6, and includes a peak hold circuit and an integration circuit.

Although not shown, the drive HDA includes a head IC which incorporates a write amplifier which supplies a recording current to the magnetic head 4, and a pre-amplifier which amplifies a reproduction voltage for the magnetic head 4.

Figure 3:
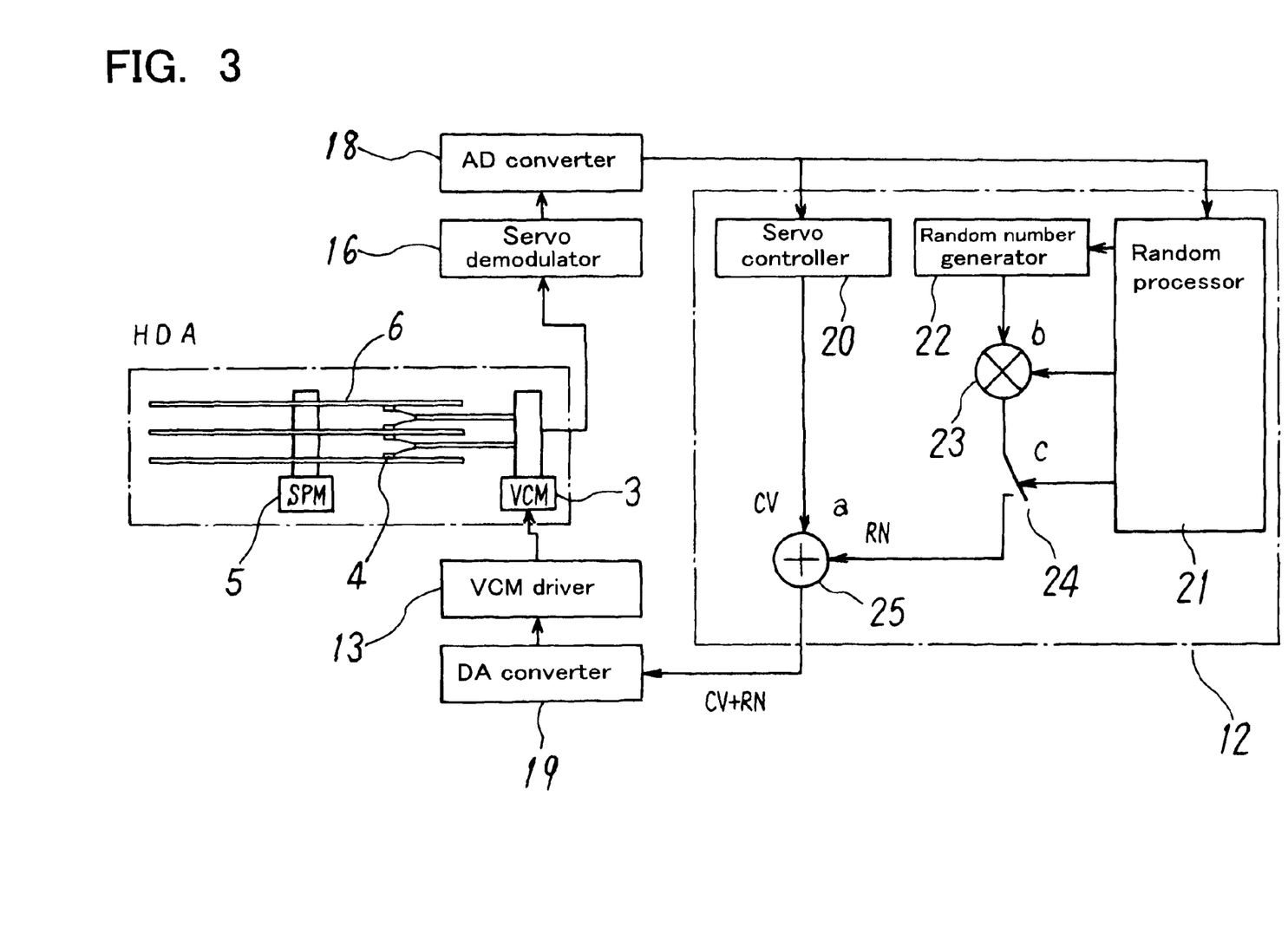
FIG. 3 is a block diagram showing the position control operation performed by a DSP in FIG. 2.
Figure 4:
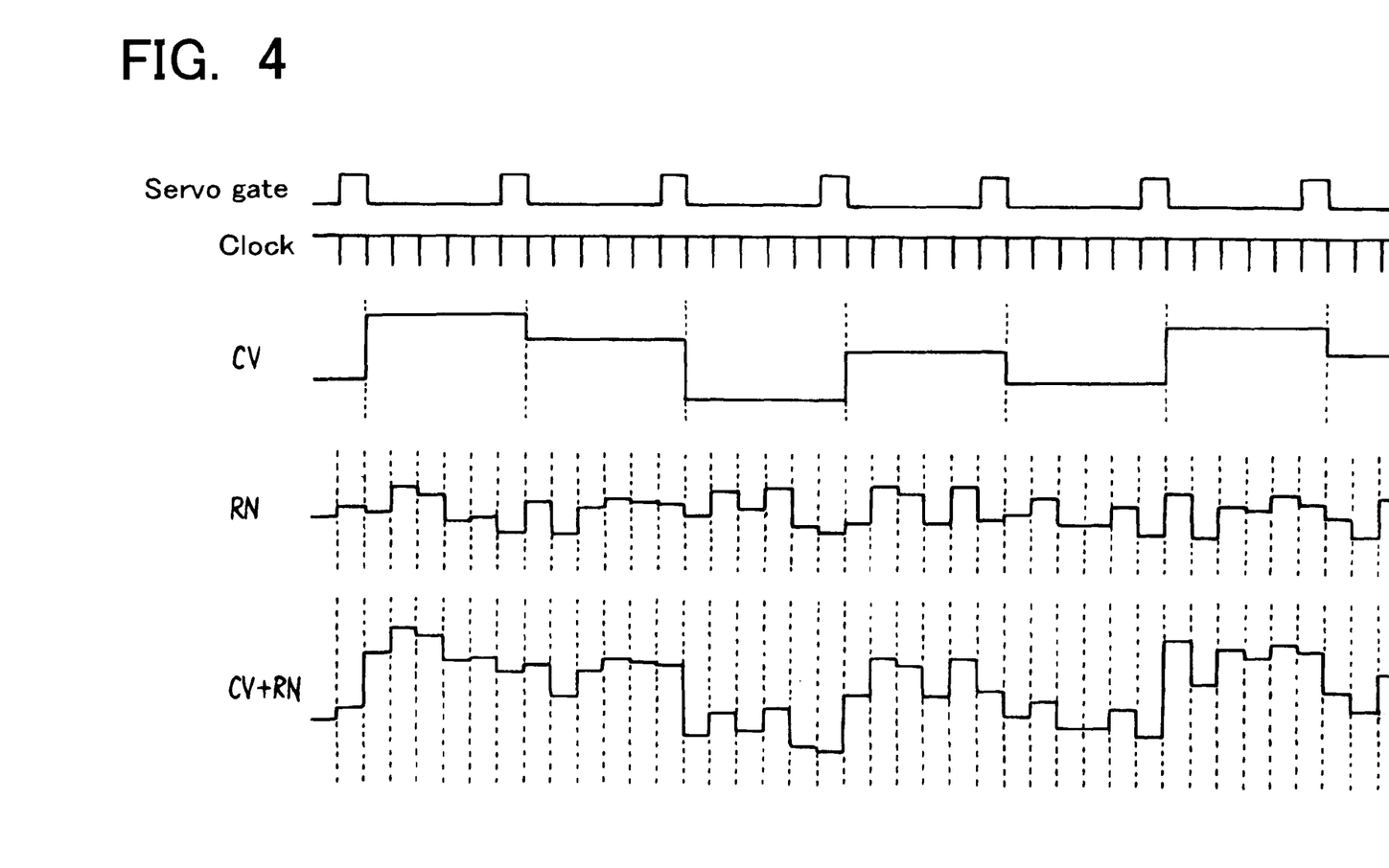
FIG. 4 is an essential waveform diagram for the arrangement in FIG. 3.

FIG. 3 is a block diagram for the positioning operation performed by the DSP 12, and FIG. 4 is an essential waveform diagram.

The servo demodulator 16 demodulates a servo signal, which is read by the magnetic head 4 to facilitate the head positioning, and obtains a voltage which corresponds to the head position, and an AD (Analog/Digital) converter 18 the converts the position signal into an 8 bit digital value. The DSP 12 reads the digital position signal, computes the servo control carried by software, and outputs a control signal, which a DA (Digital/Analog) converter 19 converts into an analog voltage. Thereafter, the VCM driver 13 amplifies the analog voltage and drives the VCM 3. And in accordance with the control value, the VCM 3 moves the magnetic head 4.

Blocks 20 to 25 in the DSP 12 are processing blocks whose functions are carried out by the program. A servo controller 20 reads the digital position signal produced by the AD converter 18, and performs a well known servo calculation. The servo controller 20 selectively exercises the seek control to move the head 4 above a target track, and the track following control for precisely tracing the specified track. For the seek control, a difference between the target track position and the present position indicated by the digital position signal is calculated to obtain a velocity signal (second control signal) corresponding to the difference. For the track following control, a position shifting distance is obtained by using the digital position signal, and a control signal which is used to set the position shifting distance to zero is obtained by performing a PID calculation.

A random-number waveform generate processor 21 generates a random number following a predetermined cycle, and produces a random wave which occupied a predetermined band. During a cycle where in the actuator 3 travels a satisfactory distance, the random-number waveform generator 21 instructs a random number generator 22 to generate a random number, and upon receiving this instruction, the random number generator 22 produces a random number (e.g., a M-series random number). The band for the random wave is a frequency equaling ½ a reciprocal of the random number generation cycle.

An attenuator 23 adjusts the level of the random wave in accordance with the instruction from the processor 21, so that, as will be described later, a positioning error is minimized. A switch 24 prevents the transmission of the random wave to the control signal, and permits only the transmission of the track following control.

An adder 25 adds the random wave to the control signal of the servo controller 20, and the sum obtained is output as the servo control signal to the DA converter 19.

FIG. 4 is an image diagram showing the waveforms output by the individual sections. Since the digital calculation is actually performed, the outputs of the individual sections are represented as numerical values; however, in the diagram the output waveforms are represented by analog images.

A servo gate signal, which represents the location of a servo signal recorded on a sector support type magnetic disk, is provided by a timer as a 5.4 Khz control signal, for example. The servo controller 20 of the DSP 12 samples the servo signal at the timing provided for the servo gate signal, and calculates the servo control signal (the control current for the VCM) CV. The control current CV is a binary digital value which is to be transmitted to the DA converter 19, and in FIG. 4 is displayed as the output image of the DA converter 19. The control current CV supplied for the track following control is also shown.

A clock provides the timing for the generation of a random wave by a software timer or a hardware timer, and the random wave generator 21 transmits this clock to the random number generator 22. The random number generator 22 produces a random number which corresponds to the clock timing, and outputs a random current RN which flows across the VCM. In this embodiment, the frequency of the clock is 32.4 Khz, which is six times the frequency of the servo gate signal. Therefore, the width of band of the random wave is ½ that of the clock frequency, i.e., 16.2 Khz. In addition to the servo control signal CV, the random wave RN is shown to describe the output image of the DA converter 19.

The servo control signal CV and the random wave RN, which is transmitted via the switch 24, are added together by the adder 25, and the VCM control signal (CV+RN) is obtained.

Since in this manner a random, minute vibration is constantly applied to the actuator, the possibility that the bearings of the actuator will assume a static state is eliminated. Therefore, the movement of the actuator is affected only by dynamic friction of the bearings, and is representative of only the linear characteristic for the rotational distance relative to the control value. As a result, the precision with which the positioning is performed is improved.

Although the random, minute control value which is constantly supplied to the servo system corresponds to a disturbance (noise), and acts to deteriorate the positioning precision, the improvement in the positioning accuracy due to the linear characteristic of the bearing movement is greater than the above described loss. As a result, the over all positioning accuracy is improved.

Since the power spectrum of the random wave is flat, the exciting quantities of a resonant point of the servo system are small, even when the random wave is introduced into the servo system.

Further, when the notch filter is inserted at the resonance point of the servo system, it can prevent over-vibration. The insert location of the filter is a VCM driver or random wave generator.

And, since both the position error (the servo signal) and the random wave have normal distributions, these normal distributions are added together. A result is then obtained by calculating the square root of the sum of the square of the first input signal and the square of the second input signal. Therefore, the sum of the signals which are normally distributed is smaller than the result obtained by simply adding together the signals which are not normally distributed. As a result, deterioration of the position accuracy can be minimized, even when the disturbance is introduced into the servo system.

Therefore, even when the magnetic disk drive employs ball bearings, the positioning precision attained by the track following control can be improved, the tracks can be narrowed, and the recording density can be increased. Further, since ball bearings which have a low cost can be employed, the cost of manufacturing a drive can be reduced.

Furthermore, since the actuator is continuously moving during the seek control operation, static friction affecting the bearings need not be considered. And therefore, during the seek control operation, the introduction of a random wave is prevented by the switch 24, and entry of an unwanted disturbance can be prevented. As a result, there is no deterioration of the seek function, and the random wave can be introduced during the seek control operation. In this case, the switch 24 is not required, and even when a program is used to implement this operation, the size of the program can be reduced.

Further, since the random number is generated, the random wave can easily be produced by digital calculation. And it is feasible that the band of the random wave is wider. The band of the random wave can be wider by the technique that, as shown in FIG. 4, the frequency of the random wave be higher than the frequency of the servo gate signal. Therefore, the control value of the servo control signal may be influenced slightly by the random signal.

Figure 5:
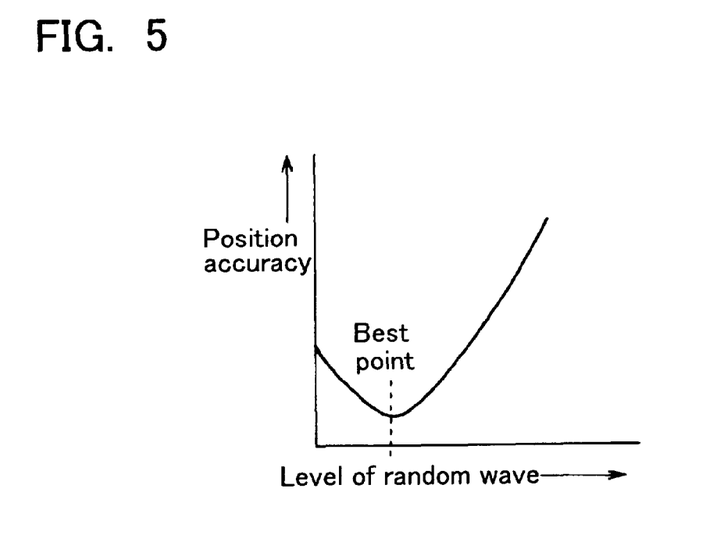
FIG. 5 is a graph showing the characteristic of a random wave level for the arrangement in FIG. 3.
Figure 6:
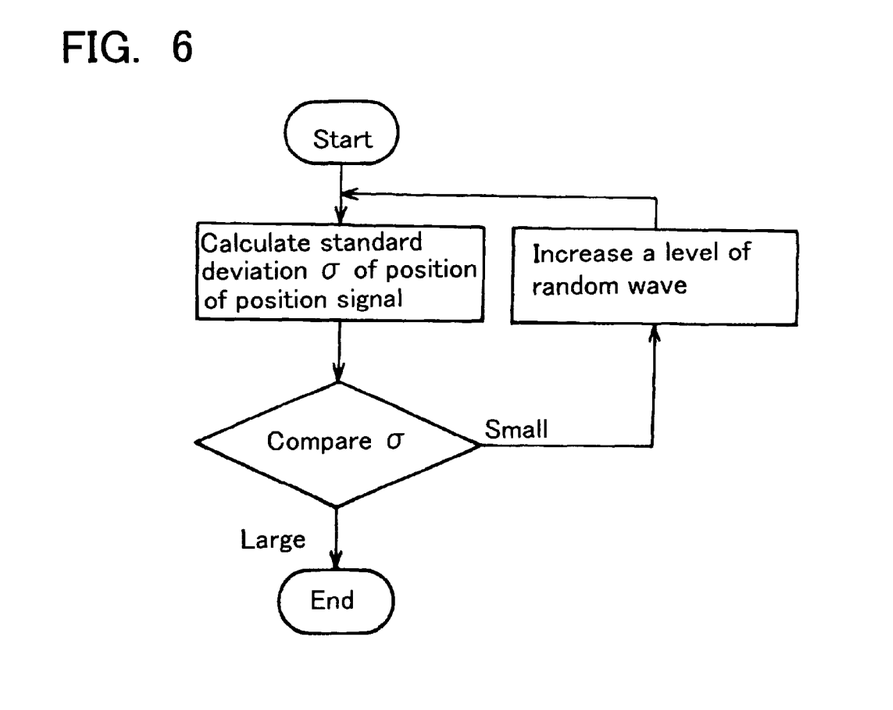
FIG. 6 is a flowchart showing the level adjustment processing performed for the arrangement in FIG. 3.
Figure 7:
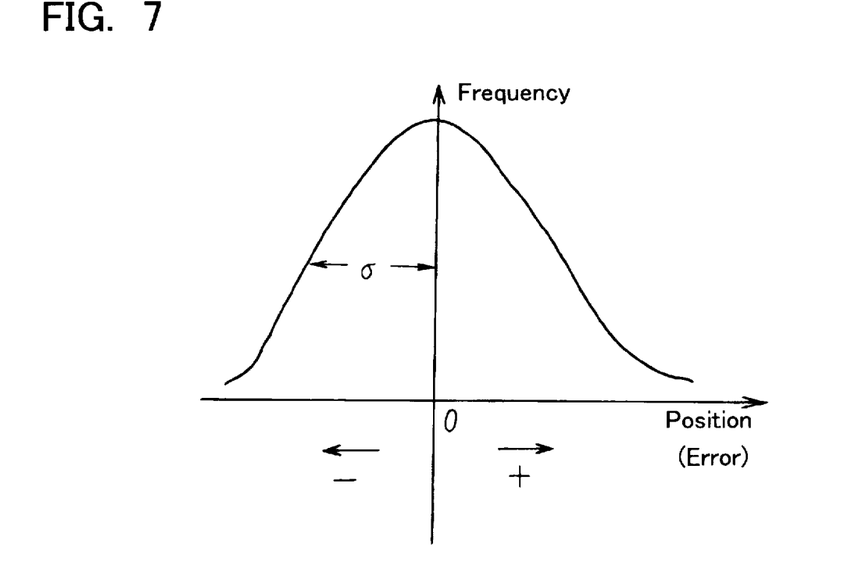
FIG. 7 is a graph showing the histogram of a digital positioning signal in the processing performed in FIG. 6.

It is preferable that the level of the random wave be determined so that the optimal positioning precision may be attained. FIG. 5 is a graph showing the relationship between the level of the random wave and the positioning accuracy (the positioning error distance). FIG. 6 is a flowchart showing the processing performed to adjust the level of the random wave, and FIG. 7 is a histogram diagram showing a positioning error value.

The level of the random wave is adjusted by the attenuator 23. As is shown in FIG. 7, the positioning accuracy can be measured by acquiring a standard deviation σ of the histogram of the positioning signal (the positioning error value). For example, the standard deviation σ is measured by position signals per one track as sample values. The standard deviation σ of the positioning signal is changed in accordance with the level of the random wave, as is shown in FIG. 5. Since there exists a level of the random wave whereat the standard deviation σ of the position signal is minimized, the optimal level for the random wave is measured to obtain the suitable positioning accuracy.

As is shown in FIG. 6, the digital positioning signal is read with changes to the level of the random wave occurring and the standard deviation σ of the digital positioning signal is calculated. The current standard deviation σ is compared with the standard deviation previously set in accordance with the level of the random wave. When the current standard deviation σ is smaller than the previous standard deviation σ, to find a more suitable level, the level of the random wave is increased and the standard deviation of the digital position signal is measured.

When the current deviation σ is greater than the previous standard deviation σ, the previous standard deviation σ is the smallest. Therefore, the previous standard deviation σ is determined to be the optimal level.

The random wave generator 21 in FIG. 3 performs this adjustment process. And since the optimal level varies depending on the magnetic disk drive that is used, the level is adjusted for individual magnetic disk drives. This level adjustment may be performed when the calibration is performed by the magnetic disk drive.

The standard deviation σ can be calculated by using equation (1).

[Equation 1]

$$\sigma = \sqrt{((\sum x^2 - n\bar{x}^2)/n)} \quad (1)$$

wherein x denotes a sample value and n denotes a sample count.

Since the level of the random wave is adjusted when the random wave is introduced into the system, the most suitable and accurate positioning can be obtained.

In addition to the above embodiment, the present invention can be modified as follows.

(1) In the above embodiment, the head positioning device for the magnetic disk drive has been employed as the positioning controller. However, the present invention can be applied for another device which positions the head above a track, such as a head positioning device for an optical disk drive.

(2) The present invention can also be applied for another positioning device which controls and shifts an actuator equipped with bearings to a target position.

The present invention can obtain the same effects by adding the random wave to the input position signal of the servo controller. It is possible to add a sine wave instead of the random wave.

The present invention has been described using the preferred embodiment. However, the present invention can be variously modified without departing from the subject of the invention, and these modifications are also included in the scope of the present invention.

As is described above, the present invention provides the following effects.

(1) Since a random, minute vibration is constantly applied to the actuator and the assumption of the static state by the bearings of the actuator is eliminated, the actuator is affected only by dynamic friction, and relative to the control value, its movement is representative of the linear characteristic. As a result, the positioning accuracy is improved.

The random, minute control value which is constantly applied to the servo system corresponds to a disturbance (noise), and acts to deteriorate the positioning accuracy. However, the improvement in the positioning accuracy provided by the linear characteristic of the bearings exceeds the loss attributable to the disturbance, and the overall positioning accuracy is increased.

(2) Since the power spectrum of the random wave is flat, exciting quantities of the resonant point of the servo system are small, even when the random wave is introduced into the servo system.

(3) In addition, since the position error and the random wave are represented as normal distributions, when the normal distributions are added together the result obtained is smaller than the sum of the two values which are not represented as normal distributions. Thus, the total control value is reduced, and the deterioration of the positioning accuracy can be minimized, even when the disturbance is introduced into the servo system.

What is claimed is:

1. A positioning method for position-controlling an actuator to a target position comprising steps of:

generating a random wave signal;

detecting a positional error to said target position for said actuator;

producing a servo control signal to position said actuator to said target position from said positional error;

adding said random wave signal to said servo control signal to produce a control signal of said actuator during track following so as to reduce a static friction of bearings in said actuator and prevent said bearings in said actuator from assuming a static state; and driving said actuator in accordance with said control signal.

2. A positioning method according to claim 1, wherein said detecting step comprises step of:

reading a signal of a recording medium by a head provided for said actuator; and detecting said positional error from said read signal, and said producing step comprises a step of generating said servo control signal to follow said head with a track of said recording medium.

3. A positioning method according to claim 2, wherein said reading step includes a step of reading a servo signal for a track on said recording medium in accordance with a servo gate signal, and wherein said random wave generating step comprises a step of generating said random wave having a frequency which is higher than the frequency of said servo gate signal.

4. A positioning method according to claim 1, further comprising a step of controlling said adding step of said random wave.

5. A positioning method according to claim 4, wherein said controlling step comprises a step of controlling said adding step so as to stop said adding when a seek operation of said actuator occurs.

6. A positioning method according to claim 1, further comprising a step of determining a level of said random wave by measuring a standard deviation of said positional error.

7. A positioning method according to claim 1, wherein said actuator has a moving portion, a fixed portion, and said bearings between the moving portion and the fixed portion to drive said moving portion.

8. A positioning device comprising:

an actuator; and a controller for position-controlling said actuator to a target position, wherein, said controller produces a servo control signal to position said actuator to said target position and adds a random wave signal to said servo control signal to produce a control signal of said actuator during track following so as to reduce a static friction of bearings in said actuator and prevent said bearings in said actuator from assuming a static state.

9. A positioning device according to claim 8, wherein said actuator includes a head for reading a signal from a track on a recording medium; and wherein said controller has a track follow mode for following said head with said track.

10. A positioning device according to claim 9, wherein said controller samples said read signal from said head at each servo gate signal, and generates said random wave having a frequency which is higher than the frequency of said servo gate signal.

11. A positioning device according to claim 8, wherein said controller controls said adding operation of said random wave.

12. A positioning device according to claim 11, wherein said controller controls stopping of said adding operation when a seek operation of said actuator occurs.

13. A positioning device according to claim 8, wherein said controller determines a level of said random wave by measuring a standard deviation of said positional error.

14. A positioning device according to claim 8, wherein said actuator has a moving portion, a fixed portion, and said bearings between the moving portion and the fixed portion to drive said moving portion.

15. A disk device comprising:

a head for at least reading a signal of a recording disk;

an actuator for moving said head as regard to said recording disk; and a controller for position-controlling said actuator to a target position of said recording disk, wherein, said controller produces a servo control signal to position said actuator to said target position and adds a random wave signal to said servo control signal to produce a control signal of said actuator during track following so as to reduce a static friction of bearings in said actuator and prevent said bearings in said actuator from assuming a static state.

16. A disk device according to claim 15, wherein said controller has a track follow mode for following said head with said track.

17. A disk device according to claim 15, wherein said controller samples said read signal from said head at each servo gate signal, and generates said random wave having a frequency which is higher than the frequency of said servo gate signal.

18. A disk device according to claim 15, wherein said controller controls said adding operation of said random wave.

19. A disk device according to claim 18, wherein said controller controls stopping of said adding operation when a seek operation of said actuator occurs.

20. A disk device according to claim 15, wherein said controller determines a level of said random wave by measuring a standard deviation of said positional error.

* * * * *